REACTOR DEVICE

Filed May 29, 1969 4 Sheets-Sheet 1

INVENTORS:
James L. Lass
Carl R. Mefford
Charles L. Curry
Attorney.

REACTOR DEVICE

Filed May 29, 1969 4 Sheets-Sheet 2

INVENTORS:
James L. Lass
Carl R. Mefford

Charles D. Curry
Attorney.

REACTOR DEVICE

Filed May 29, 1969 4 Sheets-Sheet 3

INVENTORS:
James L. Lass
Carl R. Mefford
Charles D. Curry
Attorney.

REACTOR DEVICE

Filed May 29, 1969 4 Sheets-Sheet 4

INVENTORS:
James L. Lass
Carl R. Mefford
Charles D. Curry
Attorney.

United States Patent Office

Re. 27,173
Reissued Sept. 20, 1971

27,173
REACTOR DEVICE

James Lloyd Lass and Carl Raymond Mefford, San Jose, Calif., assignors to General Electric Company Original No. 3,338,791, dated Aug. 29, 1967, Ser. No. 461,870, June 7, 1965. Application for reissue May 29, 1969, Ser. No. 835,291
Int. Cl. G21c *3/32*
U.S. Cl. 176—66 10 Claims

Matter enclosed in heavy brackets [ ] appears in the original patent but forms no part of this reissue specification; matter printed in italics indicates the additions made by reissue.

*ABSTRACT OF THE DISCLOSURE*

*A fuel bundle comprising fuel material disposed in an elongated channel, a spring assembly connected to one end of said channel, said spring assembly having a first member and a second spring member, each of said first and second spring members extending generally parallel to the other surface of the end of said channel, said first spring having a knee portion and said second spring members having a flat section.*

The present invention relates to nuclear reactor fuel bundles and more particularly to a technique for maintaining separation between fuel bundles mounted in a nuclear reactor core.

One of the problems encountered in reactor operation pertains to structural failure as a result of continuous vibration or transient conditions. Considerable difficult has been encountered in devising techniques for retaining the fuel bundles in fixed spaced relation, as required by the physics of the system, and still provide a design which will not fail under transient or vibration conditions. Many techniques have been devised to mechanically mount fuel bundles in fixed spaced relation which have included rigidly attaching the fuel bundles to a mounting structure by bolts or other rigid fastening means and by various other mechanical structural arrangements. However, these attempts have frequently met with failure in view of the large forces or continual stress imposed on the structural bond due to the transient and vibratory conditions encountered during reactor operation.

While devising a technique which overcomes the above mentioned problem it is also necessary to maintain minimum spacing between adjacent fuel bundles even though there are transient forces or mechanical failures of the structural mounts of the fuel bundles. Furthermore, it is necessary to provide a fuel bundle mounting technique that permits ease of loading and also compensates for variation in fuel bundle length and width due to accumulated tolerances or variations in temperature.

Briefly, the present invention provides a fuel bundle mounting technique that minimizes structural failures, provides ease of loading, assures minimum distance between adjacent fuel bundles and compensates for variation in fuel bundle lengths and widths. This is achieved by means of a spring biasing technique for maintaining separation between bundles by mounting spring assemblies on adjacent fuel bundles such that the springs of adjacent fuel bundles bias against each other to maintain a continuous force of separation. In addition, the spring assembly is designed to compensate for variations of lengths and widths of adjacent fuel bundles. Associated with each of the spring assemblies is a stop assembly which performs the dual function of assuring minimum separation between adjacent fuel bundles and also provides for ease of loading of adjacent fuel bundles. The particular manner in which this is achieved in the practice of this invention will be more readily understood by reference to the accompanying drawings in which:

Since the spring and stop assembly of the fuel assembly is dependent on several elements of the reactor, the following general reactor description is provided to more clearly depict the unique features of the present invention.

Figure 1:
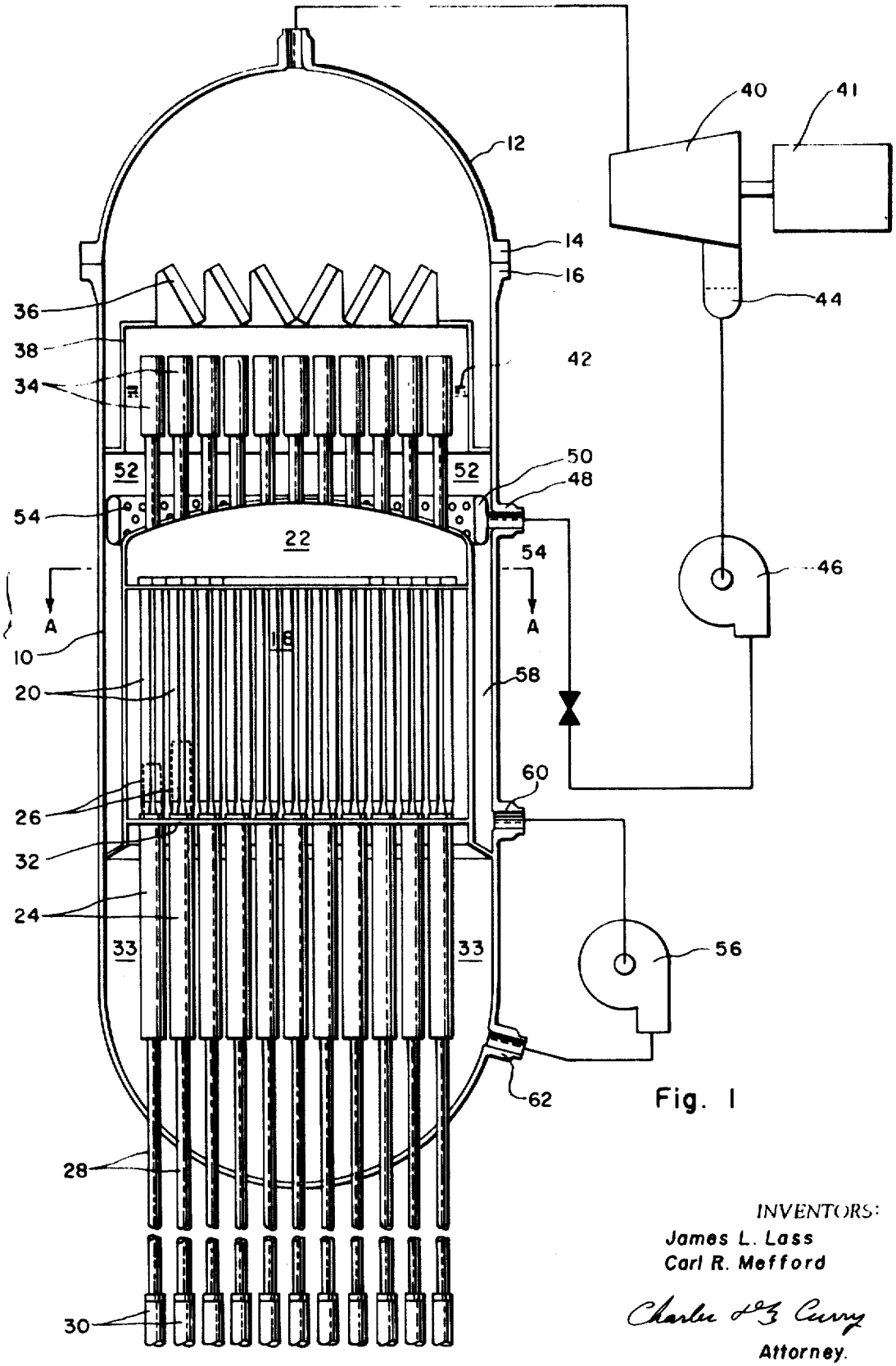
FIGURE 1 is a schematic diagram of a reactor employing the teachings of the present invention.

In FIGURE 1 is schematically illustrated a nuclear reactor power plant in which the fuel bundle spring and stop assemblies of the present invention are employed to flexibly retain the fuel bundles of the core in their proper positions. It is to be understood that the teachings of the present invention may be used with many different power plants; however, it is being described as being used with a Boiling Water Reactor since it has been found particularly useful with this type plant. The reactor system depicted in FIGURE 1 includes reactor pressure vessel 10 provided with removable head 12 which is secured by means of flanges 14 and 16. Disposed within vessel 10 is a nuclear chain reacting core 18 which includes a plurality of vertically mounted nuclear fuel bundles 20, the upper ends of which are maintained in spaced relation by the spring and stop assemblies of the present invention. Each fuel bundle consists of a plurality of longitudinally extending fuel rods (not shown) which are mounted in spaced relation and are surrounded by an open ended tubular flow channel. A top fitting is provided for each fuel bundle and is connected to the upper open end of the flow channel of the fuel bundle and communicates directly with exhaust steam plenum 22. The lower end of each fuel bundle has a bottom nose fitting connected to the lower open end of the flow channel and is detachably mounted on the upper end of control rod guide tube 24 which communicates with bottom chamber 33. The top and bottom fittings of the fuel bundles have openings therein to permit passage of fluid from chamber 33 through the fuel bundles to plenum 22.

Control rods 26 (shown ind otted lines) control the power level of the reactor and are slidably mounted in control guide tubes 24. Actuating rods 28 interconnect the control rods to drive mechanisms 30 which control the positions of the control rods in the reactor core and thereby control the power level in the desired manner. Each actuating rod 28 is sealed and slidably mounted at the lower end of reactor pressure vessel 10 and the upper end of each control rod guide tube 24 is supported by bottom guide structure 32.

In a typical boiling water reactor, steam having a quality of about 10% is generated by core 18 and is transmitted to plenum 22, the output of which is connected to steam separators 34 which separate the steam from the water. The separated steam is transmitted to steam dryer 36, which is mounted on annular support member 38, which removes more water and the dry steam obtained therefrom is then transmitted to turbine 40 which drives electric generator 41. Water which has been separated from separators 34 and dryer 36 is returned to the moderator-coolant in vessel 10, the upper level of which is illustrated by broken line 42. Low pressure output steam from turbine 40 is condensed (by a condenser not shown) and then collected in hotwell 44. Pump 46 removes the feedwater from the hotwell and transfers it through fitting 48 to annular plenum 50 which communicates directly with chamber 52 through a plurality of openings 54. The amount of water discharged from openings 54 is controlled by pump 46 to maintain the water in chamber 52 at a predetermined level. Pump 56 transfers water from the lower end of downcomer annulus 58 to chamber 33 through fittings 60 and 62. The flow rate of the water supplied to chamber 33 is determined by the combined heads of pump 56 and downcomer annulus 58. The water contained in supply chamber 33 has two basic functions. The first function is to supply water exterior of nuclear fuel bundles 20 to cause continuous upward flow of water in core 18 which maintains the exterior of the fuel bundles at a temperature less than that of saturated steam under the pressure conditions involved. This is achieved by leaking about 10% of the total flow from chamber 33 through an annular opening formed between the exterior surfaces of control rod guide tubes 24 and the associated openings in bottom grid structure 32. The second function of the water contained in chamber 33 is to supply the remaining 90% of water flow to the inside of the fuel bundles 20 such that the fuel rods disposed therein will increase the temperature of the water to that of boiling as it passes upward. This is accomplished by providing a fitting at the top of each control rod guide tube 24 that has a plurality of openings which directly connect chamber 33 with the interior of each of the four fuel bundles mounted on the particular control rod guide tube.

As previously indicated, the steam output from the fuel bundles may typically have a quality of about 10% and may be used to perform different types of work such as driving a turbine or the like. In view of the large flow rates and change in pressure and temperature conditions in reactors of this and other types, it will be apparent that various vibration and transient conditions may be encountered. Accordingly, it is necessary to provide means for structurally mounting the various elements of the reactor to be insensitive to these conditions and the present invention is directed to a successful technique for structurally mounting the fuel bundles of the reactor core.

Figure 2:
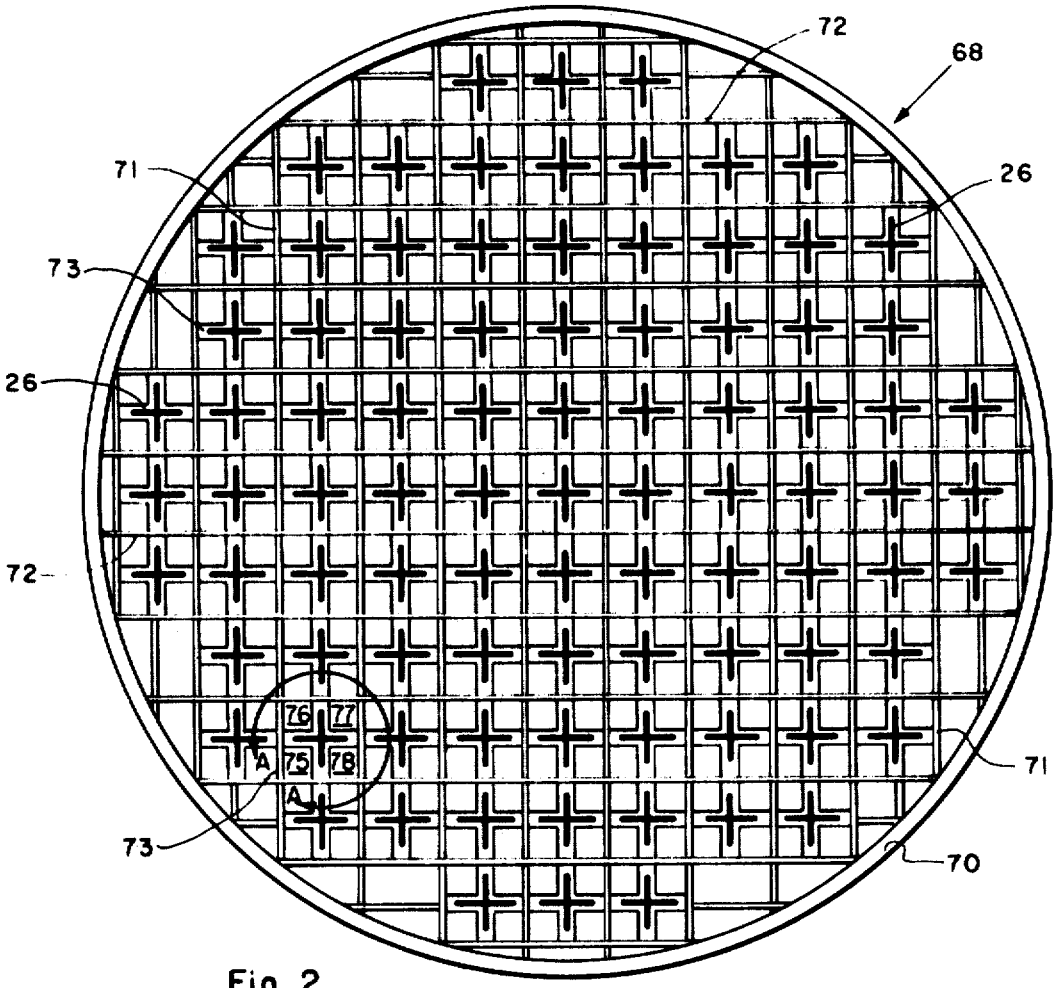
FIGURE 2 is a top view of the reactor core taken at section AA of FIGURE 1 which illustrates the placement of the fuel bundles and associated spring and stop assemblies throughout the reactor core.
Figure 5:
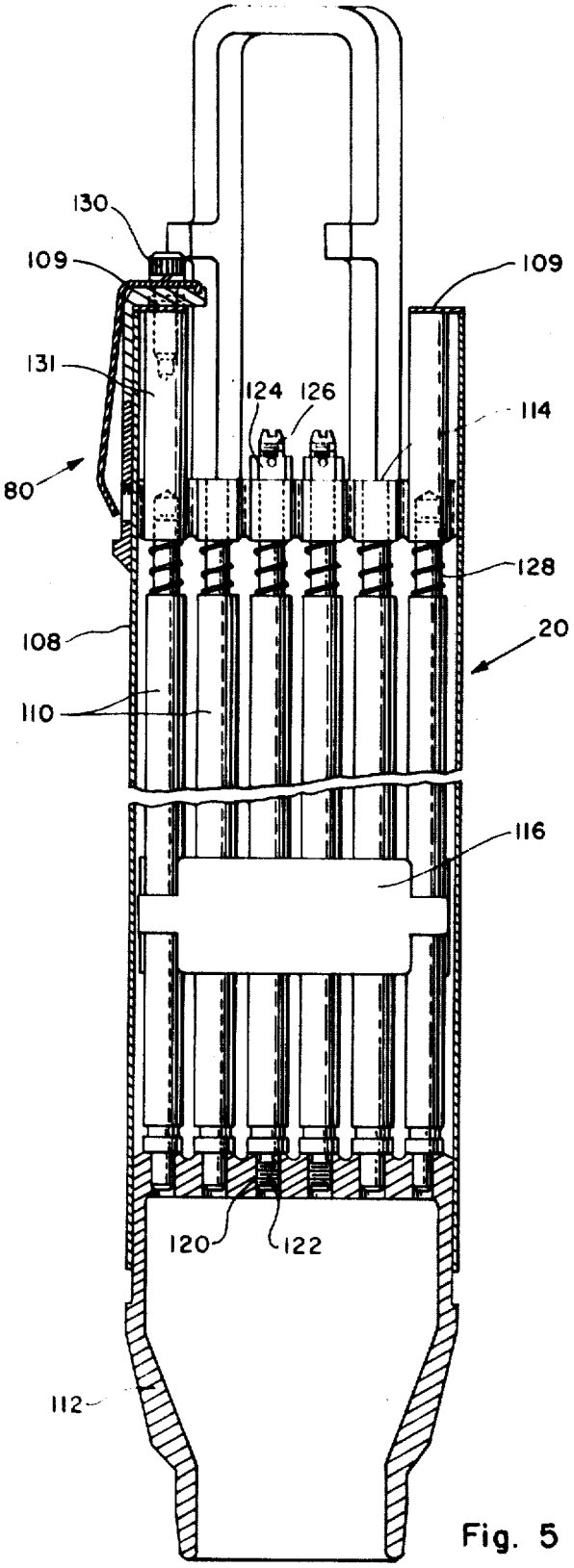
FIGURE 5 is an enlarged sectional view of a fuel bundle including the spring and stop assembly.

In FIG. 2 is illustrated a top elevation view of the reactor core 18 taken at section AA of FIG. 1. Top grid structure 68 of core 18 includes support ring 70, vertical cross members 71 and horizontal cross members 72. The horizontal and vertical cross members are interconnected at their cross-over points and their ends are connected to ring 70, thereby forming a grid structure having a plurality of cubicles 73. Fuel bundles, such as those depicted by reference numerals 75 through 78, are dispersed throughout the grid structure of core 18. Four fuel bundles occupy the four corners of a single cubicle and the lower end of these same four fuel bundles are supported in four sockets formed in the upper end of a control rod guide tube 24. It should be noted that a particular cubicle and corresponding guide tube (which supports the same four fuel bundles) are in axial alignment and are designed such that the spacing between the longitudinal axis of the four fuel bundles is the same at the top as at the bottom. Each fuel bundle is provided with a lower tie plate, a specific configuration of which is shown in FIG. 5, which seats into one of the four corresponding sockets formed in the upper end of the control rod guide tube 24.

Figure 3:
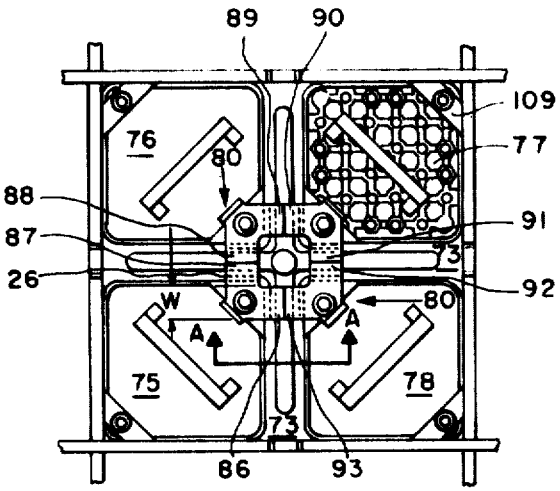
FIGURE 3 is an enlarged view of the fuel bundles and associated spring and stop assemblies taken at section AA of FIGURE 2.

Because of the physics of the reactor and because control rods 26 must be free to move into and out of the core, it is essential that the upper end (as well as the lower end) of each of the fuel bundles remain in fixed spaced relation as best depicted in FIGS. 1 through 3. The function of the present invention is to assure this fixed spaced relation and yet provide fuel bundles that are virtually free of mechanical failure when subjected to transverse forces or vibrations and are also easily inserted into the core. This is achieved by employing a unique spring and stop assembly 80 in each fuel bundle, the details of which are shown in FIGS. 3 through 8.

Figure 4:
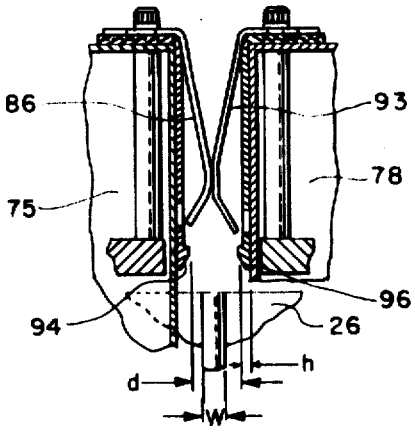
FIGURE 4 is an enlarged view of adjacent spring and stop assemblies taken at section AA of FIGURE 3.

FIG. 3 is an enlarged view of FIG. 2 taken at section AA and more clearly depicts the structural arrangement of the fuel bundles and associated spring and stop assemblies disposed in a single cubicle 73. Fuel bundle 75 includes springs 86 and 87, fuel bundle 76 includes springs 88 and 89, fuel bundle 77 includes springs 90 and 91, and fuel bundle 78 includes springs 92 and 93. As best depicted in FIG. 4, which is an enlarged view of adjacent spring and stop assemblies taken at section AA of FIG. 3, these springs (such as 86 and 93) exert force against each other such that each of the fuel bundles (such as 75 and 78) remains in its respective corner of the cubicle. In addition, each fuel bundle is provided with two stops which are illustrated by dotted lines in FIG. 3.

In FIG. 4, reference numeral 94 identifies one of the stops of bundle 75 and reference number 96 identifies one of the stops of bundle 78. Control rod 26, made of material having a high thermal neutron capture cross-section and having a cruciform shape, is disposed in the space formed between bundles 75 through 78 and functions to control the power level of the reactor. As previously indicated, spacing between fuel bundles is an extremely important parameter in the physics of the core and it is also essential that the spacing or gap between the bundles never closes less than a predetermined distance since it may be necessary to rapidly insert the control rods into the core. The primary function of the stops (such as 94 and 96) is to assure that fuel bundles 75 through 78 never close less than the width of the blade of the control rod. Therefore, the height H of each stop must be greater than half the width W of the blade of the control rod. In addition, each of the stops is selected to have a width (W, see FIGS. 3 and 6) such that adjacent stops will always come into contact, regardless of the position to which the fuel elements are shifted. For example, assume there is a transient force and fuel bundle 75 is moved to the right such that stop 94 is in facial contact with stop 96 of fuel bundle 78. Assume also that fuel bundle 76 is then moved downward. The stops are selected to have a width W such that, under this set of conditions, they will always be in facial contact and therefore assure minimum separation between the fuel bundles. From this it can be seen that the minimum width W of each stop must be greater than half the distance D between the faces of adjacent stops when the fuel bundles are firmly held in their respective corners of the cubicle. It can therefore be seen that minimum separation will always be maintained between adjacent fuel bundles, regardless of their shift in relative positions. In like manner, the widths of springs 86 through 93 are selected so that adjacent springs will always remain in facial contact, regardless of the position to which the fuel bundles are shifted in the cubicle. In view of the foregoing, it will be evident that during transient or vibratory conditions, the upper ends of fuel bundles are free to move predetermined maximum distances and then be returned to the original corner positions. This freedom of lateral motion minimizes structural failures since it eliminates forces from being applied to rigid mechanical members and yet the lateral motion is limited so that the control rods may always be inserted into the core.

Reference is now made to FIG. 5 which illustrates the details of fuel bundle 20 and the associated spring and stop assembly. Fuel bundle 20 generally consists of open ended tubular channel 108, fuel rods 110, lower tie plate 112, upper tie plate 114, spacers 116, and spring and stop assembly 80. Channel 108 is an elongated tube having a nearly square cross-section with the upper end having corner members 109 which are provided to support the channel after it has been inserted over the fuel rods and one of these members is also used to support the spring and stop assembly. Fuel bundle 20 is assembled by mounting fuel rods 110 in a plurality of spacers 116, the details of which are not illustrated since they do not form a part of the present invention, such that a predetermined spaced relation is achieved between the adjacent fuel rods. The spacers are separated a predetermined distance for example, 2 feet, and are connected to one or more of the fuel rods to prevent longitudinal movement of the spacers with respect to each other. Lower tie plate 112 has the configuration illustrated and is received by the socket formed in the upper end of the previously described control rod guide tube 24. Lower tie plate 112 is also provided with threaded openings 120, which received threaded ends 122 of the fuel rods such that the lower tie plate may be rigidly connected to a plurality of the fuel rods. Upper tie plate 114 is secured to these same threaded fuel rods by tightening nuts 124 to threaded extensions 126. Compression springs 128 are provided to maintain a load, which is determined by the torque applied to nuts 124, between upper tie plate 114 and the upper shoulder of fuel rods 110. After the above members have been assembled in the described manner, channel 108 is inserted thereover such that its lowermost end is in contact with the peripheral surface of lower tie plate 112, as illustrated. The channel is then held in place by bolt 130, which is inserted through an opening provided in spring and stop assembly 118, and attached extension 131 of upper tie plate 114.

Figure 6:
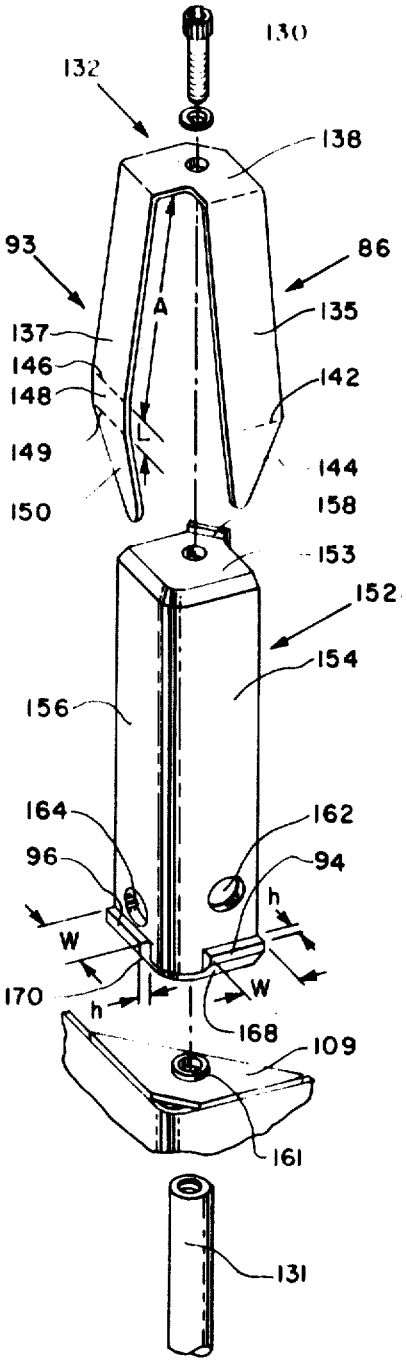
FIGURE 6 is an enlarged exploded pictorial view of the spring and stop assembly.
Figure 7:
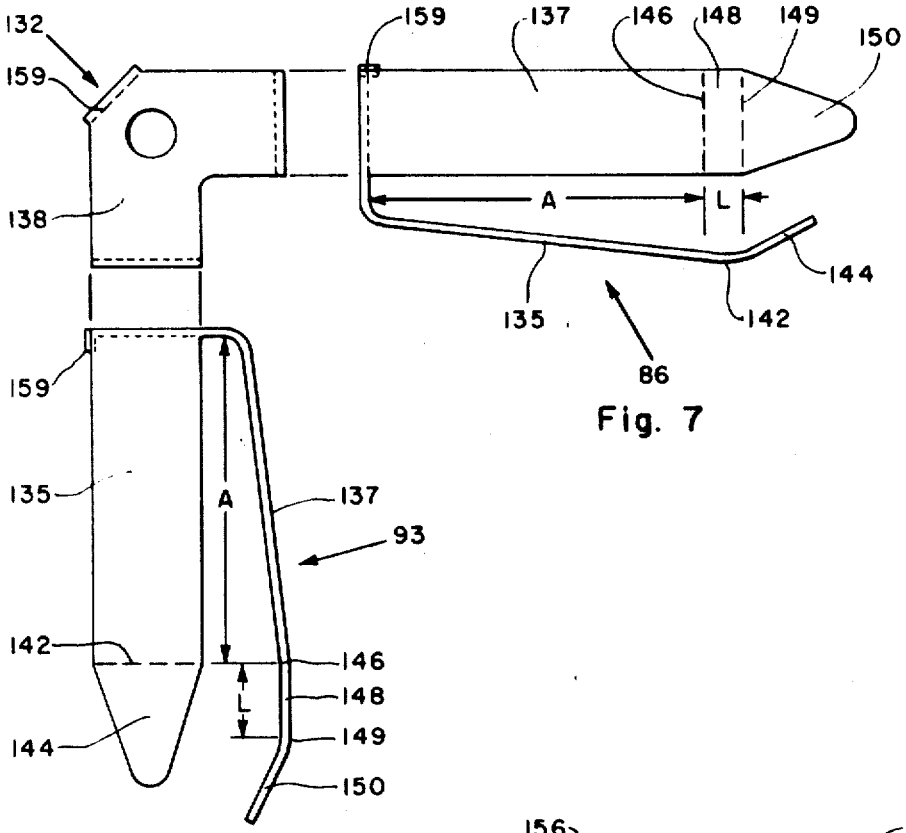
FIGURE 7 is an enlarged view of the spring assembly showing the top and side elevations.
Figure 8:
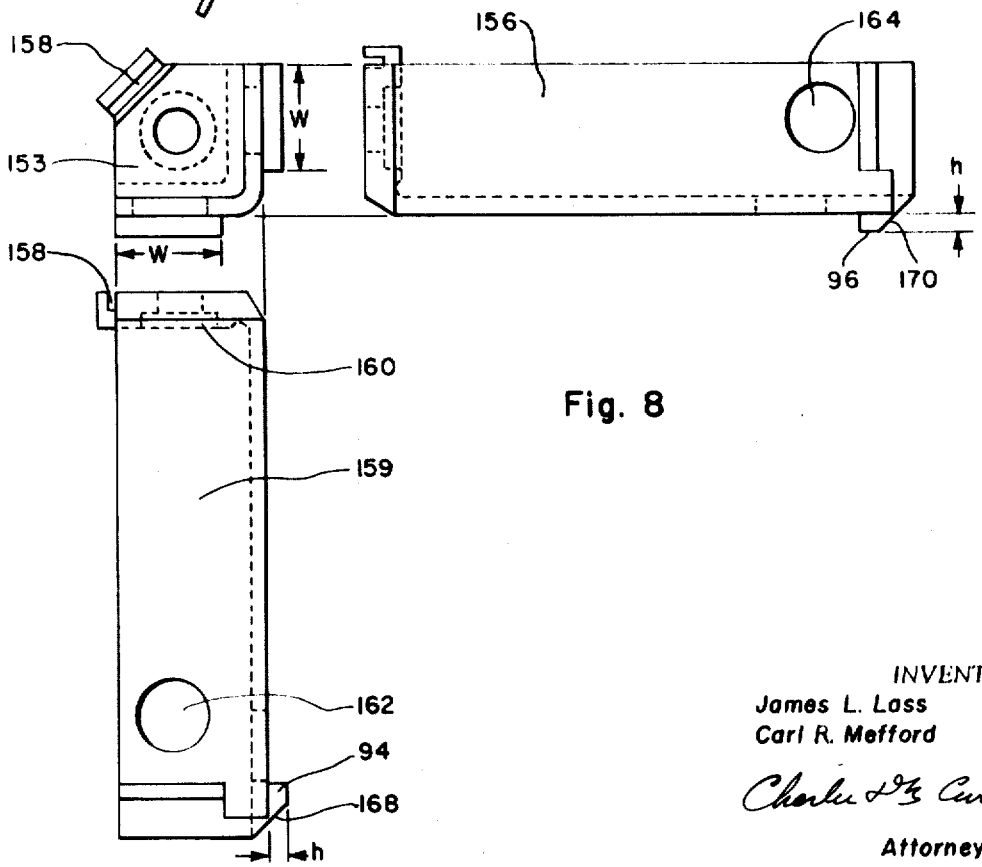
FIGURE 8 is an enlarged view of the stop assembly showing the top and side elevations.

The details of spring and stop assembly 80 are illustrated in the exploded pictorial view of FIG. 6 and the plan and elevation views of FIGS. 7 and 8. The basic elements of spring assembly 132 include spring leaf member 86, spring leaf member 93 and top section 138. These basic elements of spring assembly 132 are integrally formed; however, it is to be understood that these elements could be formed from separate materials and then connected by welding, riveting or the like. Spring leaf member 86 has a downwardly and outwardly extending base section 135, a downwardly and inwardly extending end section 144 and a knee portion 142 formed therebetween. Spring leaf member 93 has a downwardly and outwardly extending base section 137, a downwardly extending flat section 148 and a downwardly and inwardly extending end section 150. It should be particularly noted that spring leaf member 93 includes flat section 148 and extends downwardly a greater length than spring leaf member 86.

The amount of force exerted by adjacent springs is important for several reasons. Among these are the requirements that sufficient force be provided to retain the fuel bundles in the corner of the cubicle and yet not be so large as to provide a nearly rigid structure which would severely inhibit loading and either impede longitudinal expansion of the fuel bundles or cause deformation of the spring assembly. Accordingly, it is necessary that adjacent springs exert a predetermined constant force against each other when the fuel bundles are mounted in the reactor core. To achieve this objective spring leaf member 93 of spring assembly 132 has a flat section 148 having a length L and a ratio of length A to length L (A/L) that is relatively large.

The length L of spring leaf member 93 is selected such that knee 142 of spring leaf member 86 will always remain in facial contact with flat section 148, even when encountering the maximum possible accumulation of tolerances and temperature differentials between adjacent fuel bundles. This is particularly important in large reactors where several hundred fuel bundles may be employed in the core which will generally result in at least several adjacent fuel bundles having substantially different lengths. If flat section 148 were not provided, then variations in length of adjacent fuel bundles would result in misalignment of adjacent knee portions 142 which would result in a reduction in force applied by the contacting springs of the adjacent fuel bundles. With severe misalignment this could result in no force being applied which would then permit free movement of the fuel bundles which would be a highly undesirable condition. In addition, the length A is long as compared to length L of spring leaf member 93 and therefore, since the lever arm remains nearly constant, adjacent spring leaf members 86 and 93 of different spring assemblies will always exert nearly the same force regardless of the position of knee 142 of leaf member 86 along the length L of leaf member 93.

From FIGS. 6 and 7 it can be seen that a plane made perpendicular to the plane surfaces of spring leaf member 86 would intersect at a ninety degree angle with a plane made perpendicular to the plane surfaces of spring leaf member 93. In addition, these spring assemblies are mounted on the fuel bundles (see FIG. 3) such that adjacent spring assemblies are rotated ninety degrees with respect to each other. As a result, adjacent pairs of leaf members that are in facial contact will always consist of spring leaf member 86 and spring leaf member 93.

In actual practice it is desirable to use spring assembly 132 in conjunction with stop assembly 152. As best depicted in FIG. 8, stop assembly 152 generally consists of top section 153, flat section 154 and flat section 156 which are integrally formed; however, it is to be understood that these sections may be formed from separate material and then connected by welding, riveting or the like. Top section 153 includes groove 158 which is used to receive downwardly extending flange 159 of top section 138 of spring assembly 132 which prevents spring 132 from rotating. Top section 153 also includes cylindrical cavity 160 which is formed in the lower surface thereof to receive circular flange 161 which is rigidly fastened to corner member 109. Flat sections 154 and 156 respectively include stops 94 and 96 which function to assure minimum separation between adjacent bundles in the manner heretofore described. It should be particularly noted that section 154 has an opening 162, and section 156 has an opening 164. These openings are provided to respectively receive the ends of spring leaf members 86 and 93 to provide unimpeded spring travel throughout maximum possible spring deflection. Openings 162 and 164 are provided at different distances from top section 166 to accommodate the different lengths of spring members 86 and 93. In addition, stops 94 and 96 are respectively provided with tapers 168 and 170 which function to prevent the spring and stop assembly 118 from being caught on an adjacent fuel bundle while the fuel bundle is being loaded into the reactor core. As best depicted in FIG. 4, stops 94 and 96 also protect spring leaf members 86 and 93 from being bent or otherwise damaged while being loaded into the reactor core.

Specific examples of the spring and stop assemblies are as follows.

(A) Spring assembly 132:
- (1) Type of material ---------- Inconel X.
- (2) Material thickness ---------- .06".
- (3) Material width ---------- ¾".
- (4) Spring leaf member 86 (over-all length) ---------- 3 3/16".
- (5) Spring leaf member 93:
  - (a) Length L ---------- ½".
  - (b) Length A ---------- 2 5/16".
  - (c) Over-all length ---------- 3 7/16".

(B) Stop assembly 152:
(1) Type of material _____ 304 stainless steel.
(2) Material thickness _____ 1/8".
(3) Over-all width _____ 1 1/32".
(4) Overall length _____ 3 13/16".
(5) Stop width W _____ 3/4".
(6) Stop height h _____ .140".
(C) Force exerted by adjacent springs against corner positioned fuel bundles _____ About 10 pounds.

In view of the foregoing it can be seen that the previously described spring assembly provides a technique by which the spring forces maintaining the fuel bundles in their proper positions will remain nearly constant irrespective of differences in length of adjacent fuel bundles. Furthermore, when the spring assembly is used in conjunction with the stop assembly, an arrangement is provided which not only provides constant spring forces but also provides easily loaded fuel bundles and also fuel bundles that will maintain the required separation when mounted in the reactor core. It should be understood that many design changes may be made in the previously described spring assembly and stop assembly, such as variations in length, width, thickness, types of materials, and in the shape of the particular elements. It should also be understood that the spring assembly or spring assembly and stop assembly may have utility with various groupings of fuel bundles. For example, these assemblies may be used with groups of one, two or four fuel bundles, in which instances the cubicles would be respectively designed to receive one, two and four fuel bundles and associated spring and stop assemblies.

A particular embodiment of this invention has been described and it should be understood that various other modifications and adaptations thereof may be made by those skilled in this particular art without departing from the spirit and scope of this invention as set forth in the following claims.

We claim:

1. A fuel bundle which comprises fuel material disposed in an elongated channel, a spring assembly connected to one end of said channel, said spring assembly having a first spring member and a second spring member, each of said first and second spring members [being coextensive with] *extending generally parallel to* the outer surface of the end of said channel, said first spring member having a knee portion and said second spring member having a flat section.

2. A fuel bundle which comprises fuel material disposed in an elongated channel, a spring assembly connected to one end of said channel, said spring assembly having a first spring member and a second spring member, each of said first and second spring members [being coextensive with] *extending generally parallel to* the outer surface of the end of said channel, said first spring member having a knee portion and said second spring member having a flat section, the distance from the end of said channel to said knee portion being about equal to the distance from the end of said channel to the center of said flat section.

3. A fuel bundle for a nuclear reactor which comprises fissionable fuel material disposed within an elongated channel, a spring assembly connected to one end of said channel, said spring assembly having first and second elongated spring leaf members, each of said first and second elongated spring leaf members extending downwardly [and being coextensive with] *along* the outer surface of the end of said channel, said first spring leaf member having a downwardly and outwardly extending base section, a downwardly and inwardly extending end section and a knee portion formed therebetween, said second spring leaf member having a downwardly and outwardly extending base section, a downwardly extending flat section and a downwardly and inwardly extending end section.

4. A fuel bundle which comprises fuel material disposed in an elongated channel, a spring assembly connected to one end of said channel, said spring assembly comprising a top section, a first elongated spring leaf member and a second elongated spring leaf member, said first and second spring leaf members extending downwardly from said top section and being spaced from [and coextensive with] the outer surface of the end of said channel, said first spring leaf member having a downwardly and outwardly extending base section, a downwardly and inwardly extending end section and a knee portion formed therebetween, said second spring leaf member having a downwardly and outwardly extending base section, a downwardly extending flat section and a downwardly and inwardly extending end section.

5. A fuel bundle which comprises fuel material disposed in an elongated channel, a spring and stop assembly comprising a spring assembly and a stop assembly, said spring assembly having a first spring member and a second spring member, each of said first and second spring members being spaced from and [coextensive with] *extending along* the outer surface of the end of said channel, said stop assembly having first and second sections, said stop assembly mounted on said channel with each of said first and second sections being adjacent to and [coextensive with] *extending along* the outer surface of the end of said channel, each of said first and second sections having a stop extending outwardly from the end thereof, said spring assembly mounted on said stop assembly.

6. A fuel bundle which comprises fuel material disposed in an elongated channel, a spring and stop assembly comprising a spring assembly and a stop assembly, said stop assembly having a top section, a first section and a second section, said top section mounted on said channel with each of said first and second sections being adjacent to and [coextensive with] *extending along* the outer surface of the end of said channel, each of said first and second sections having a stop extending outwardly from the end thereof, said spring assembly comprising a top section, a first elongated spring leaf member and a second elongated spring leaf member, said top section of said spring assembly mounted on the top section of said stop assembly, said first and second spring members extending downwardly from the top section of said spring assembly and spaced from and *substantially* coextensive respectively with said first and second sections of said stop assembly.

7. A fuel bundle which comprises fuel material disposed in an elongated channel, a spring and stop assembly comprising a spring assembly and a stop assembly, said stop assembly having a top section, a first section and a second section, said top section being mounted on a top corner of said channel, each of said first and second sections being adjacent to [and coextensive with] the outer surface of the end of said channel, each of said first and second sections having a stop extending outwardly from the end thereof, a first opening formed in said first section a predetermined distance from the end thereof, a second opening formed in said second section a distance less than said predetermined distance from the end thereof, said spring assembly comprising a top section, a first elongated spring leaf member and a second elongated spring leaf member, the top section of said spring assembly mounted on the top section of said stop assembly, said first and second spring members extending downwardly and spaced from [and coextensive respectively with] said first and second sections *respectively* of said stop assembly, said first spring leaf member having a downwardly and outwardly extending base section, a downwardly and inwardly extending end section and a knee portion formed therebetween, the end of said end section being adjacent said first opening, said second spring leaf member having a downwardly and outwardly extending base section, a downwardly extending flat section and a downwardly and inwardly extending end section, the end of said last mentioned end section being adjacent said second opening.

8. A fuel bundle which comprises fuel material disposed in an elongated channel, a spring and stop assembly comprising a spring assembly and a stop assembly, said stop assembly having a top section, a first section and a second section, said top section having a groove formed in the upper surface thereof, each of said first and second sections being adjacent to [and coextensive with] the outer surface of the end of said channel, each of said first and second sections having a stop extending outwardly from the end thereof, said spring assembly comprising a top section, a first elongated spring leaf member and a second elongated spring leaf member, said top section of said spring assembly having a downwardly extending flange, said top section of said spring assembly mounted on the top section of said stop assembly with said flange inserted in said groove, said first and second elongated spring leaf members extending downwardly from the top section of said spring assembly *adjacent to* and spaced from [and coextensive respectively with] said first and second sections *respectively* of said stop assembly.

9. A fuel bundle which comprises fuel material disposed in an elongated channel having four sides and upper and lower ends, an upper corner of said channel being formed between first and second about perpendicular adjacent sides of said channel, a spring assembly mounted on said upper corner, said spring assembly having a first elongated spring leaf member spaced from and [coextensive with] *extending along* said first side of said channel, said spring assembly having a second elongated spring leaf member spaced from and [coextensive with] *extending along* said second side of said channel, said first elongated spring leaf member having a knee portion spaced from said first side of said channel and said second elongated spring leaf member having a flat section spaced from and about parallel to said second side of said channel.

10. A fuel bundle which comprises fuel material disposed in an elongated channel having four sides and upper and lower ends, an upper corner of said channel being formed between first and second about perpendicular adjacent sides of said channel, a spring and stop assembly comprising a spring assembly and a stop assembly, said stop assembly having first and second sections, said stop assembly mounted on said upper corner and having said first and second sections being respectively adjacent to [and coextensive with] said first and second about perpendicular adjacent sides, each of said first and second sections having a stop extending outwardly from the end thereof, said spring assembly mounted on said stop assembly, said spring assembly having a first elongated spring leaf member *adjacent to and* spaced from [and coextensive with] said first section, said spring assembly having a second elongated spring leaf member *adjacent to and* spaced from [and coextensive with] said second section, said first elongated spring leaf member having a knee portion spaced from said first section elongated spring leaf member having a flat section spaced from and about parallel to said second section.

References Cited

The following references, cited by the Examiner, are of record in the patented file of this patent or the original patent.

UNITED STATES PATENTS

| | | | |
|---|---|---|---|
| 3,087,882 | 4/1963 | Martin | 176—81X |
| 3,175,957 | 3/1965 | Costes et al. | 176—87 |
| 3,205,144 | 9/1965 | Jabsen | 176—87X |
| 3,389,056 | 6/1968 | Frisch | 176—78 |
| 3,431,170 | 3/1969 | Lass et al. | 176—66X |

CARL D. QUARFORTH, Primary Examiner

G. SOLYST, Assistant Examiner

U.S. Cl. X.R.

176—78, 81, 82

UNITED STATES PATENT OFFICE
CERTIFICATE OF CORRECTION

Patent No. RE 27,173 Dated 20 September 1971

Inventor(s) James L. Lass, Carl R. Mefford

It is certified that error appears in the above-identified patent and that said Letters Patent are hereby corrected as shown below:

Column 1, ; line 33, "difficult" should be --difficulty--. Column 2, line 57, "ind otted" should be --in dotted--; line 59, insert --rod-- after "control". Column 5, line 17, there should be a comma after "distance"; line 24, "received" should be --receive--. Column 10, line 19, after "first section" insert --and said second--.

Signed and sealed this 13th day of June 1972.

(SEAL)
Attest:

EDWARD M.FLETCHER, JR.
Attesting Officer

ROBERT GOTTSCHALK
Commissioner of Patents

USCOMM-DC 60376-P69
☆ U.S. GOVERNMENT PRINTING OFFICE : 1969 O—366-334